United States Patent [19]

Wenzel

[11] 4,056,866

[45] Nov. 8, 1977

[54] FISH PROCESSING MACHINES

[75] Inventor: Werner Wenzel, Lubeck, Germany

[73] Assignee: Nordischer Maschinenbau Rud. Baader, Lubeck, Germany

[21] Appl. No.: 675,117

[22] Filed: Apr. 8, 1976

[51] Int. Cl.² .......................................... A22C 25/16
[52] U.S. Cl. ........................................ 17/57; 17/52
[58] Field of Search .......................... 17/52, 54, 56, 57

[56] References Cited

U.S. PATENT DOCUMENTS

| 2,518,772 | 8/1950 | Grausgruber | 17/57 |
| 2,669,746 | 2/1954 | Baader | 17/57 |
| 2,683,893 | 7/1954 | Baader | 17/56 |
| 2,684,500 | 7/1954 | Jones et al. | 17/54 |
| 2,704,378 | 3/1953 | Schlichting | 17/54 |
| 2,893,052 | 7/1959 | Schlichting | 17/56 |
| 3,187,375 | 6/1965 | Williamson et al. | 17/59 X |
| 3,525,120 | 8/1970 | Jobmann | 17/57 X |
| 3,908,230 | 9/1975 | Hartmann | 17/52 X |

Primary Examiner—Russell R. Kinsey
Assistant Examiner—Paul J. Hirsch
Attorney, Agent, or Firm—Edward F. Levy

[57] ABSTRACT

A machine for filleting fish of various species comprising belly filleting knives for making belly cuts, bone knives for separating the vertebral appendages from the vertebrae without separating the flank fillets from the fish, rib knives for cutting the already separated vertebral appendges from the fish, and back filleting knives for finally separating the flank fillets from the fish. Also guide means are provided in close relationship with the bone knives to limit the cutting depth of the latter.

5 Claims, 6 Drawing Figures

FISH PROCESSING MACHINES

BACKGROUND OF THE INVENTION

The invention relates to a machine for filleting fish, in particular fish of differing bone structures.

Fish filleting machines are individually adapted to cut with high yield only a single kind of fish, such as herrings, redfish, Norwegian haddock, and hake, and a few closely related kinds of fish with closely similar bone structure, such as codfish, haddock and ling. The main obstacle to the possiblity of being able to cut fish of different kinds with a particular filleting machine is the different angles at which lateral vertebral appendages extend from the vertebrae of the backbones of fish of differing kinds.

In German Pat. Specification No. 1,454,089, there is disclosed a process and apparatus for severing the flank flesh from the ribs and vertebral appendages of a fish, wherein the rear vertebrae of the fish are engaged and the abdominal cavity of the fish is firmly pressed onto a support in such a manner that the vertebral appendages and ribs are straightened so that each flank forms a plane, whereupon the flank flesh is cut off by insertion of a cutting tool between the skin covering the ribs and the vertebral appendages and the skin enveloping the flesh. However, this process is restricted to fish having vertebral appendages which can be straightened under pressure and which extend from the vertebrae of the backbone at equal angles.

In Norwegian Pat. Specification No. 106,624, there is described a filleting machine in which fillets are severed from the skeleton by back filleting knives and by belly filleting knives, and are separated from the ribs by rib knives arranged parallel to the belly filleting knives. With this machine, it is possible to cut out the ribs in fish of differing bone structures, but the belly filleting knives must cut on both sides of the broadest vertebrae, which entails an appreciable loss of valuable flesh. This is not acceptable when seeking an economical yield from the filleting of fish such as coryphaena hippurus, cynoscion nebulosus, micropogon undulatus or other fish from southern latitudes.

BRIEF SUMMARY OF THE INVENTION

An essential object of the invention is to provide a possiblity to process fish of differing bone structure all in one machine even if the fish belong to quite different species and especially show differing angles at which their vertebral appendages extend from the vertebrae. It is another important object of the invention to achieve this at high yield and in a machine having a pair of rib knives arranged at a fixed, i.e. constant angle to each other.

According to the present invention, there is provided a filleting machine for filleting fish, comprising a pair of belly filleting knives to make respective incisions in the belly of a fish, a pair of bone knives for separating vertebral appendages from the backbone of such fish without cutting the flank fillets from the fish, a pair of rib knives for cutting the separated vertebral appendages from such fish, and a pair of back filleting knives for cutting the flank fillets from such fish.

Preferably, the machine comprises guide means associated with the bone knives and adapted to so engage in the abdominal cavity of a fish being cut by the bone knives as to limit the depth of the cuts severing the vertebral appendages.

For preference, each pair of knives comprises a pair of rotatable cutting discs, and the knives of the belly filleting, bone and back filleting knife pairs are arranged in parallel planes, and the knives of the rib knife pair are arranged in planes angled relative to each other and to the planes of the other knives. The bone knives may be adjustable relative to the conveying path in vertical direction.

The advantages achieved by the arrangements according to the invention consist in that the incisions made by the bone knives may allow the flank fillets to spread apart at the angle present between the rib knives, and in addition the fish may be guided accurately along the conveying path and conveyed through the rib knives without being subjected to loadings which stress the fillets.

The guide means associated with the bone knives may ensure that the incisions made by these knives are at the requisite spacing and only to the necessary depth.

BRIEF DESCRIPTION OF THE DRAWINGS

Other and further objects of the present invention will be apparent from the following description and claims and are illustrated in the accompanying drawings which by way of illustration show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the cope of the appended claims.

In the drawings.

DETAILED DESCRIPTION OF THE PREFERRED EMBODIMENTS

Figures 3, 4:
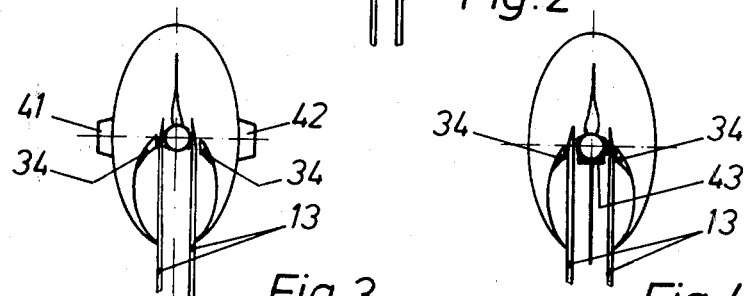
FIG. 3 is a cross-section through the abdominal cavity of a fish during cutting of the vertebral appendages of the backbone of the fish by the machine of FIG. 1, the fish being conveyed by a pair of conveyor belts.
FIG. 4 is a cross-section similar to that of FIG. 3, the fish being conveyed by a push saddle.
Figure 5:
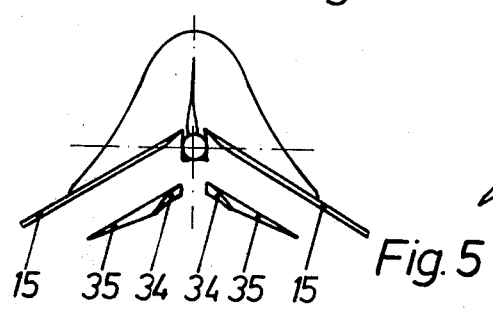
FIG. 5 is a cross-section through the abdominal cavity of a fish during cutting of the separated vertebral appendages and the ribs from the fish by the machine of FIG. 1.
Figure 6:
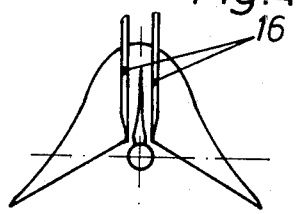
FIG. 6 is a cross-section through the abdominal cavity of a fish during the cutting of the flank fillets by the machine of FIG. 1.

Referring now to the drawings, there is shown a filleting machine having arranged in a frame thereof cutting tools in the form of rotatable cutting discs driven by suitable drive means (not shown), the tools comprising a belly slitter 11, a pair of belly filleting knives 12, a pair of bone knives 13 and a pair of rib knives 15 arranged underneath the conveying path for the fish to be filleted, and a pair of back filleting knives 16 arranged above the conveying path. The conveying path for the fish is defined by a first abdominal cavity guide 21, a pair of second abdominal cavity guides 22, a pair of cutting boards 23, cut limiters 24 and a pair of fillet guides 25. The cutting boards 23 and the cut limiters 24 are deflectable in a known manner on arrival of the abdominal cavity end of a fish, for which purpose two back guides 26 and 27 displaceable by the fish are utilised. For conveying the fish, there is provided conveying means which can be of a known kind, for example a pair of conveyor belts 41 and 42 engaging the flanks of fish as shown in FIG. 3, or a push saddle 43 as shown in FIG. 4. When the saddle 43 is utilised, the belly slitter 11 and abdominal cavity guide 21 are dispensed with.

The mode of operation of filleting machine is as follows:

A fish, which has had at least its head removed, is manually or automatically fed with its belly facing downwards and its head end facing forwards along the abdominal cavity guide 21 in the direction of arrow 5, and is opened along its abdominal cavity by the belly slitter 11. The belly filleting knives 12 cut the belly side of the fish to the depth of the lower edge of vertebrae 31 and on either side of the belly spokes 33. While the abdominal cavity of the fish, guided on the guides 22, is disposed above the bone knives 13, these are held in a raised position and cut the belly side of the fish closely adjacent to and on either side of the vertebrae so as to sever lateral vertebral appendages from the vertebrae 31. When the tail of the fish moves on past the bone knives 13, these knives are lowered to the position 14 shown in dot-dashed lines in FIG. 1. During the advance of the fish, the cutting board 23 is lowered, by an amount appropriate to the size of fish, to feed the fish to the rib knives 15, which cut from the fish on either side thereof a strip containing the black belly skin, ribs 35 and the ertebral appendages 34.

Figure 1:
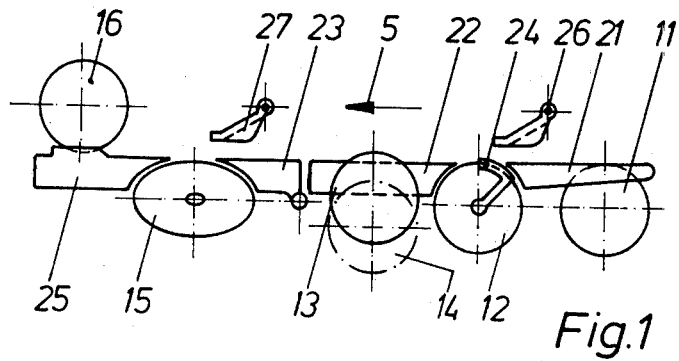
FIG. 1 is a schematic side elevation of the machine according to the invention.
Figure 2:
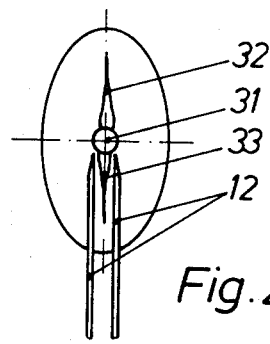
FIG. 2 is a cross-section through the tail part of a fish during cutting of a belly fillet by the machine of FIG. 1.

The bone knives 13 may be raised and lowered between the full line position and broken line position 14 of FIG. 1 by conventional means known in the art. Such knife moving means are shown and described in detail, for example, in U.S. Pat. No. 3,309,730 issued on Mar. 21, 1967, wherein cams are employed for raising and lowering the knives as well as raising and lowering guide means associated with the knives.

As an equivalent alternative, the bone knives 13 herein may be fixedly mounted against vertical movement and the abdominal cavity guides 22 (as well as guides 21, cutting boards 23, cut limiters 24 and fillet guides 25, if desired) made movable relative to the fixed bone knives in the manner described in the aforementioned U.S. Pat. No. 3,309,730, so as to limit the depth of the cuts severing the vertebral appendages.

During further advance of the fish, the back filleting knives 16 cut the back of the fish to completely sever the two flank fillets from the backbone of the fish.

When the push saddle 43 is used as conveying means, the fish is similarly conveyed belly downwards with its tail end facing forward in the direction of the arrow 5, and the incisions are made by the belly filleting knives 12, the bone knives 13, the rib knives 15, and the back filleting knives 16 in a similar manner.

What is claimed is:

1. A filleting machine for filleting fish wherein said fish are transported belly-side-down and head end leading along a conveying path, said machine comprising
   a pair of space-apart belly filleting knives for making respective incisions in the belly of a fish transported along said conveying path, to provide separated flank fillets at opposite sides of the belly cavity.
   a pair of spaced-apart bone knives located downstream of said belly filleting knives along said path and positioned to extend upwardly through the belly cavity of the fish and to cut upwardly through the vertebral appendages on either side of the fish backbone whereby to separate said vertebral appendages from said backbone without cutting the flank fillets from the fish.
   a pair of rib knives located downstream of said bone knives and arranged to extend into said belly cavity for cutting the severed vertebral appendages from said flank fillets while leaving the latter intact with said backbone,
   and a pair of back knives located downstream of said rib knives for cutting the flank fillets from said fish.

2. A filleting machine according to claim 1 which also includes guide means associated with said bone knives for guiding said fish in said conveying path along said bone knives, said guide means being mounted in a fixed position and said bone knives being mounted for movement toward and away from said guide means, said guide means being located to insure the limitation of the depth of the cuts severing the vertebral appendages by said bone knives.

3. A filleting machine according to claim 1 which also includes guide means associated with said bone knives for guiding said fish in said conveying path along said bone knives, said bone knives being mounted in a fixed position and said guide means being mounted for movement toward and away from said bone knives, with said guide means being adapted to engage the belly cavity of said fish and position said fish relative to said bone knives in such a manner as to limit the depth of the cuts severing the vertebral appendages of said fish.

4. A filleting machine according to claim 1 in which each pair of knives comprises a pair of rotatable cutting discs and in which the knives of each of the belly filleting, bone and back filleting knife pairs are arranged in parallel planes, the knives of the rib knife pair being arranged in planes angled relative to each other and to the planes of the other knives.

5. A filleting machine according to claim 4 in which said bone knives are mounted for movement relative to the conveying path in a vertical direction.

* * * * *